United States Patent [19]

La Pierre et al.

[11] Patent Number: 5,100,246
[45] Date of Patent: Mar. 31, 1992

[54] PULL BEAD AND GUIDE RAILS FOR EASY OPEN FLEXIBLE CONTAINERS

[75] Inventors: Frank La Pierre, Chicago; Daniel P. McDonald, Arlington Heights, both of Ill.

[73] Assignee: Illinois Tool Works Inc., Glenview, Ill.

[21] Appl. No.: 595,240

[22] Filed: Oct. 9, 1990

[51] Int. Cl.⁵ .............................. B65D 33/14
[52] U.S. Cl. ...................... 383/204; 383/61; 383/65; 383/95
[58] Field of Search .............. 383/61, 63, 65, 93, 383/95; 206/604, 617, 618, 628

[56] References Cited

U.S. PATENT DOCUMENTS

| | | | |
|---|---|---|---|
| 3,198,228 | 8/1965 | Naito | 150/3 |
| 3,226,787 | 1/1966 | Ausnit | 383/61 |
| 3,323,707 | 6/1967 | King | 229/66 |
| 3,371,696 | 3/1968 | Ausnit . | |
| 3,473,589 | 10/1969 | Gotz | 150/3 |
| 3,543,343 | 12/1970 | Staller et al. | 18/14 |
| 3,780,781 | 12/1973 | Uramoto | 150/3 |
| 3,827,472 | 8/1974 | Uramoto . | |
| 3,991,801 | 11/1976 | Ausnit | 383/61 |
| 4,268,938 | 5/1981 | Walchli | 383/63 |
| 4,615,045 | 9/1986 | Siegel . | |
| 4,651,504 | 3/1987 | Bentsen . | |
| 4,657,792 | 4/1987 | Ausnit . | |
| 4,682,366 | 7/1987 | Ausnit et al. . | |
| 4,709,533 | 12/1987 | Ausnit . | |
| 4,712,690 | 12/1987 | Stohr | 206/628 |
| 4,812,074 | 3/1989 | Ausnit et al. . | |
| 4,844,759 | 7/1989 | Boeckmann . | |
| 4,846,585 | 7/1989 | Boeckmann | 383/5 |
| 4,874,257 | 10/1989 | Inagaki . | |
| 4,878,763 | 11/1989 | Ausnit . | |
| 4,898,975 | 1/1990 | Ausnit . | |
| 4,925,316 | 5/1990 | Van Erden et al. | 383/61 |
| 4,927,271 | 5/1990 | Branson | 383/5 |
| 4,966,470 | 10/1990 | Thompson et al. | 383/61 |

FOREIGN PATENT DOCUMENTS

| | | | |
|---|---|---|---|
| 101218 | 6/1965 | Denmark | 383/63 |
| 955780 | 4/1964 | United Kingdom | 383/63 |

OTHER PUBLICATIONS

P. 451 of The Wiley Encyclopedia of Packaging Technology, 1986.

Primary Examiner—Gary E. Elkins
Attorney, Agent, or Firm—Thomas W. Buckman

[57] ABSTRACT

An easy-open container having a membrane forming the top edge of the container and hermetically sealing the contents thereof. The membrane is disposed inward from the mouth of the bag, leaving portions of the bag walls extending upward beyond the container top edge to form guide rails which facilitate opening of the container to gain access to the bag contents. A membrane for sealing the mouth opening of a bag-like structure. A method for making a membrane as aforesaid and a method for making an easy-open container having the structure aforesaid are also provided.

33 Claims, 4 Drawing Sheets

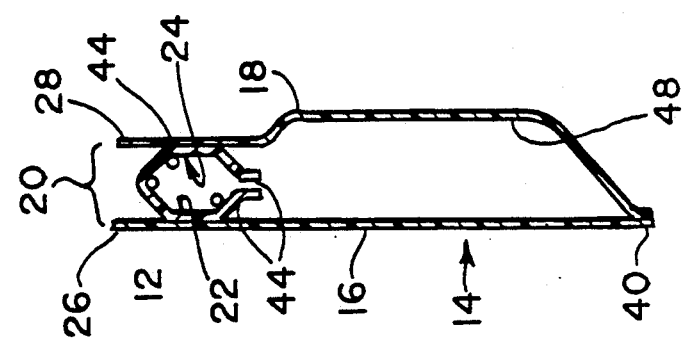
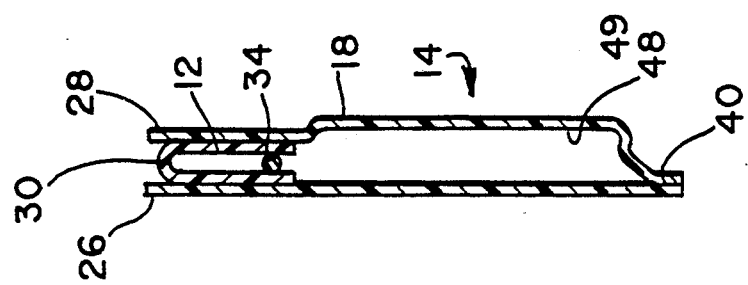
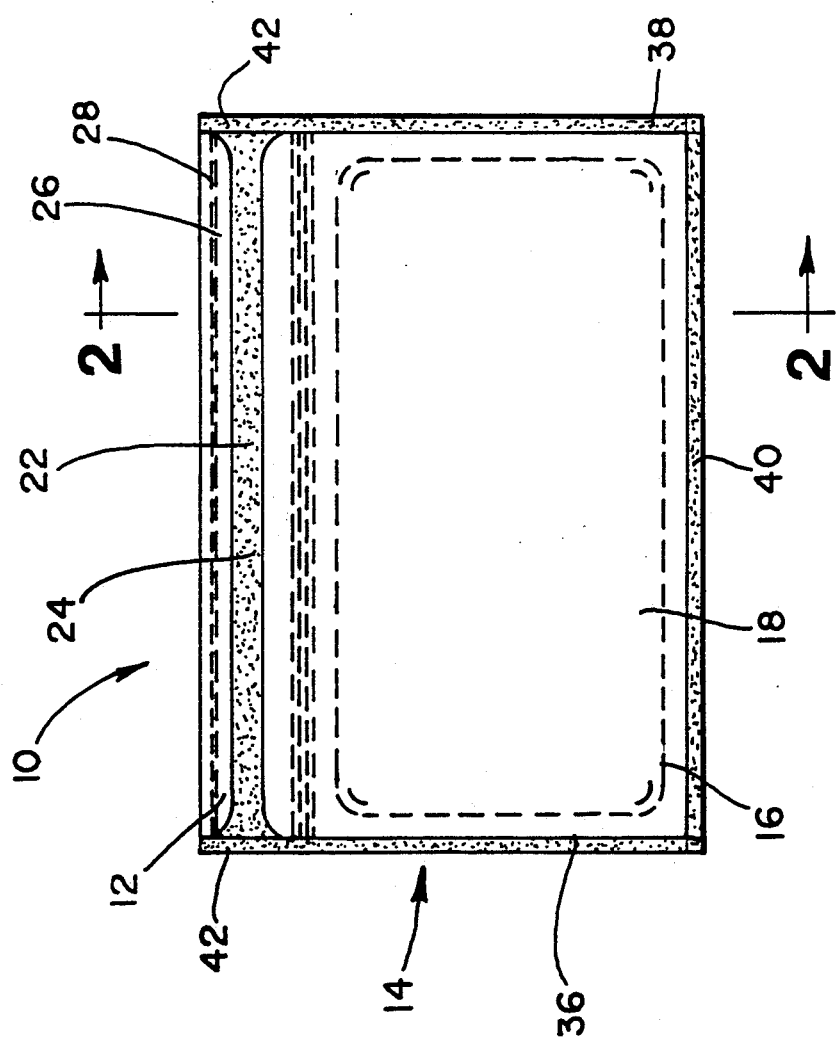

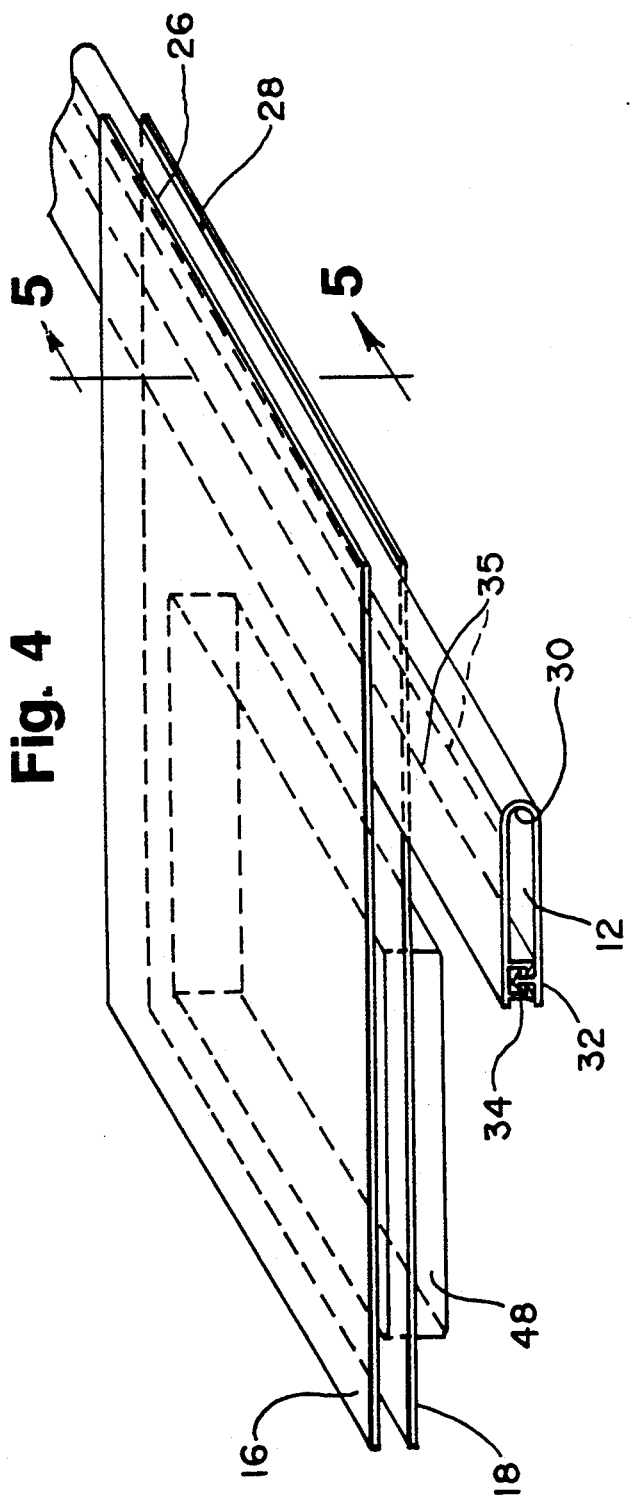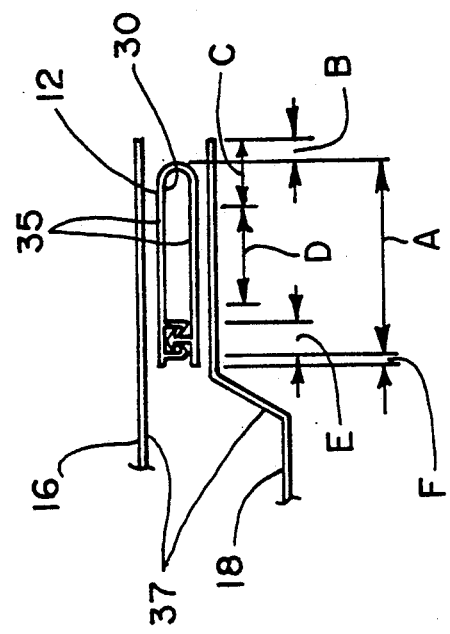

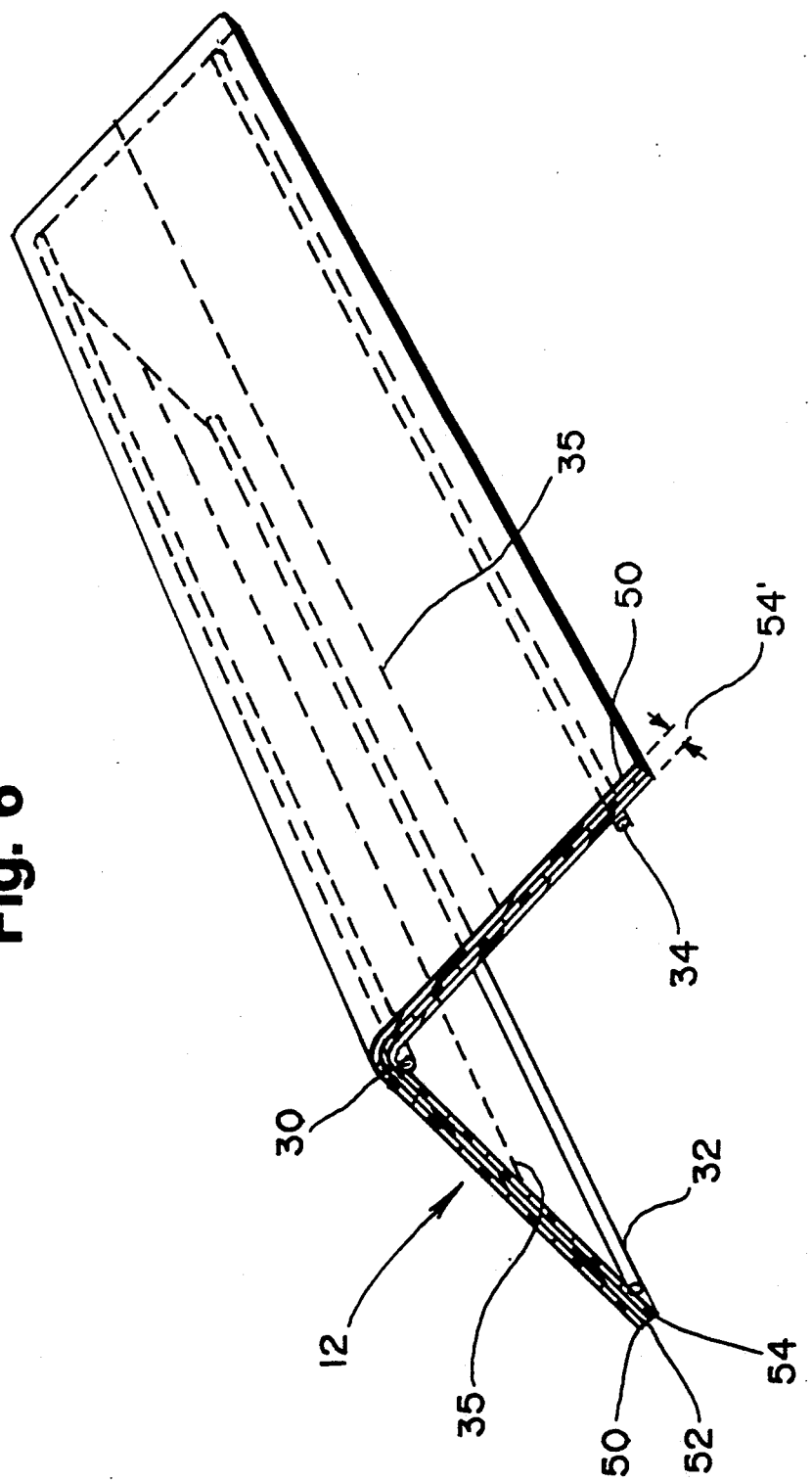

PULL BEAD AND GUIDE RAILS FOR EASY OPEN FLEXIBLE CONTAINERS

The present invention relates to a method for making improved means for opening flexible containers. In particular it relates to a method for incorporating a separate film or membrane having interlocking zipper elements into a bag-like structure to form an easy-open reclosable flexible container. The present invention further relates both to the membrane and flexible containers produced by the method.

Because reclosable flexible containers are by their very nature accessible, accidental or intentional contamination of contents has long been an object of concern. One approach has been to hermetically seal reclosable flexible containers to protect the contents thereof. Use of hermetic seals, however, has required the further development of easy-open features, such as tear strips and perforated or weakened lines for tearing to disrupt the seal and gain access to the bag contents. Many easy-open features desirably evidence any tampering with the container seals.

Among the approaches to hermetically sealing flexible containers is the attachment of separate films or membranes over the mouth opening of a bag-like structure so that the membrane serves as the top edge of a container. See, for example, Inagaki U.S. Pat. No. 4,874,257. Thereafter, the membrane which forms the hermetic seal may be ruptured to gain entry to the bag contents, irreversibly evidencing such entry. In Inagaki cutting is evidently the means of rupturing since no other opening means are disclosed.

However, other opening means for rupturing hermetically sealed containers are known. Thus, Siegel, U.S. Pat. No. 4,615,045 discloses a bag structure having a separable bag top closure including interlocking profiles. One flange of the top closure has an upward extension for hanging the bag. Opposing flanges form a tongue which seals the bag mouth and may be removed by tearing across serrations, perforations, or weakened lines therein, to gain access to the bag contents. Unless the tongue on the bag is intact, there would be an indication that access to the bag was attained or attempted.

Ausnit, U.S. Pat. No. 4,894,975 (the '975 patent), discloses a membrane having interlocking zipper elements. The membrane is folded and sealed to opposing bag walls to form a tamper-evident security seal across the mouth of the bag which also serves as the top edge of the container. The top of the seal may be torn off along parallel lines of weakened tear resistance to open the bag.

Of further relevance is Ausnit et al, U.S. Pat. No. 4,812,074 (the '074 patent), wherein a film containing interlocking zipper elements is sealed to a web of thermoplastic material forming a two-layered area of film and web. Folding the web brings the zipper elements into opposing relationship with the film layer inside and the web layer outside the top edge of the container which results. The film, thus, does not serve alone to seal the edge of the container. The '074 patent further discloses a tear strip located in the film by which both the film and web may be torn to gain access to the bag contents.

Problems have arisen in the use of various means to open hermetically sealed containers. Because of concerns with contamination and freshness, use of perforations or serrations to define a weakened line for tearing, as disclosed by Siegel, are not practical in many applications, particularly in packaging foodstuffs. They provide a series of small openings to the bag contents through which bacteria may migrate or contaminants may be introduced undetected. Problems have also arisen with containers having narrowed regions for tear lines as disclosed in the '975 patent. For example, consumers have been unable to actually tear the thermoplastic material. Further, once weakened regions are initially torn, irregular tearing may deviate off-line down the bag lips. Irregular tearing is a problem which also accompanies the use of tear strips, such as used in the '074 patent, as the tear lines may deviate down the bag lips and propagate into the zipper elements, compromising the strength, shape and operation of the zipper elements.

Accordingly, further developments are needed to facilitate easy-opening of reclosable containers, while maintaining a tamper-evident barrier to contamination.

SUMMARY OF THE INVENTION

The present invention meets the continuing need for new and improved easy-open reclosable containers having hermetic, tamper-evident seals which are easily opened without damage to the interlocking zipper elements. In the present invention, an easy-open reclosable container results from folding and then sealing a membrane across the opening of a bag-like structure. A bag-like structure may include, without limitation, diverse structures such as balloons, envelopes, socks and sleeves, as well as more traditional sacks, pouches and bags, and hereafter for simplicity is referred to as a bag. The bag opening is defined by two generally opposing bag walls to which the membrane is sealed. So folded and sealed, the membrane forms an edge of the container along the fold.

The membrane, having first and second surfaces, includes interlocking first and second zipper elements on the first surface thereof. Means for tearing, such as a first bead of thermoplastic material, are preferably disposed generally centrally between the zipper elements, and either immersed in the membrane material, or on the first or second surfaces thereof. Thus, when the membrane is folded and sealed to opposing bag walls the zipper elements are brought into opposing relationship, with the means for tearing generally located along the edge of the container formed by the film. The presence of the membrane eliminates the need for a peel seal to protect the contents of the bag. Moreover, disruption of the membrane to gain access to the bag, whether by means for tearing or otherwise, may be detected, making the bag tamper-evident.

Of particular significance in the present invention is the sealing of the membrane at locations along the inside of opposing bag walls disposed inward from the mouth of the bag, leaving portions of the bag walls extending upward beyond the container edge to form guide rails. Several advantages are provided by this structure. The guide rails thus formed, promote upward tearing of the membrane by the means for tearing. As the membrane and the bag are separately produced, they may be made from different materials making possible the use of different material properties and thicknesses. And, while the membrane is preferably made of thin thermoplastic material which may be easily ruptured by means for tearing, attachment of the membrane inward from the bag opening further permits the bag walls to serve as reinforcement against the propagation of tear lines down the membrane, protecting the integrity of the zipper elements thereon. As well, the guide rails serve as protection against accidental damage or puncture of the membrane by shielding contact between the second surface thereof and the external environment. Once the container has been opened, the guide rails provide additional gripping area for opening the bag, and the bag side walls remain of equal length, unaffected by opening the bag. Additional means for gripping, such as second beads of thermoplastic material, may be added to the membrane anywhere on the first surface, preferably between the means for tearing and the zipper elements. So located, means for gripping such as second beads of thermoplastic material would also serve to resist deviation of the tear line down the membrane.

In sealing the membrane to the inside of the bag walls, the portion of the membrane carrying the first and second zipper elements may be left unattached to the bag walls. This structure has the advantage of allowing the bag to expand somewhat without producing stress which would tend to open interlocked zipper elements. This is of particular interest in practicing one embodiment of the present invention wherein the bag is formed with a cavity or pocket to receive products, such as foodstuffs, and in other embodiments where a simple bag is filled with product.

More efficient bag side seals are made possible by the present invention as the zipper elements, disposed on a membrane of thin thermoplastic material, present a thinner cross-section which requires less time and temperature to seal than traditional thicker, single extrusion low density zipper elements. Further, the second surface of the membrane may be comprised of high heat melt material, as in the preferred multi-layer embodiment below, which facilitates rapid low temperature sealing of the membrane to the bag walls.

In the present invention the preferred means for tearing is an oval-shaped bead of thermoplastic material, such as low density polyethylene (LDPE), disposed on the first surface of the membrane along with the zipper elements which may also be LDPE. It has been found that the oval shape of the bead enhances the tearing action of the bead when one of the narrow faces of the oval bead is disposed against the first surface. So disposed, the narrow face serves as the leading edge for tearing the membrane, and its cross-section has a knife-like effect on the membrane. Notches or slits along one or more of the bag side seals may be included to help initiate tearing.

Further, the preferred embodiment of the present invention includes a membrane having two or more layers which are made of materials which provide desirable sealing or manufacturing properties. In one embodiment, the membrane has three layers, an inner heat resistant layer which serves as the first surface; a middle barrier layer; and an outer sealing layer which serves as the second surface of the membrane. The inner heat resistant layer, preferably comprised of high density polyethylene (HDPE), prevents fusing together opposing portions of the first surface of the membrane when the second surface thereof is sealed to opposing bag walls. The middle barrier layer, preferably comprised of saran (polyamylidene chloride), polyamide or ethylene vinyl alcohol (EVOH), includes properties which enhance hermetic sealing with the membrane. The outer sealing layer, is preferably a carboxylic acid ethylene copolymer, such as ethylene acrylic acid (EAA) or ethylene vinyl acetate (EVA), having a low heat melt temperature which facilitates sealing the membrane to opposing bag walls at low temperatures and high speeds. In an alternative embodiment, a two layer membrane is provided having inner and outer layers providing first and second surfaces, respectively. In this alternative embodiment, the inner layer, preferably comprised of HDPE, serves to prevent fusing together of opposing portions of the first surface of the membrane. The outer layer remains as described above.

The present invention further provides a method for producing an easy-open container. The method, best performed in an intermittent step-wise manner, produces individual sealed, easy-open containers from three webs, a form web and a top web, from which the bag sides are ultimately formed, and a membrane web. More particularly, a form web is directed to a horizontal forming station where a pouch, pocket or female cavity is formed. The form web then proceeds to a filling station where product is loaded into the cavities. The form web then proceeds to a pre-seal station where a folded membrane web having interlocking zipper elements is aligned with the form web and positioned inward from the top edge of the form web. The membrane is then sealed to the form web with a first seal. The first seal extends along the second surface of the membrane web between the means for tearing and the edge of the membrane web, and is preferably in an area inward from the means for tearing and above the first zipper element. This first seal is accomplished by first feeding then, during a pause in web movement, by raising a pre-seal assembly to compress the form web and membrane web together against the back-up plate to form a weld seal bond. The form web with membrane web sealed thereto, next advances to a pre-flattening station. IN the pre-flattening station the top web is drawn over and positioned above the form web and membrane web. The top edge of the top web is preferably aligned with the top edge of the form web, but may be offset slightly to enhance parting the two bag sides which ultimately result to access the means for tearing. As the web movement again pauses, a sealing assembly lowers to compress the top web against the membrane web and form web. Heat and pressure are applied to two areas by the sealing assembly. These areas lie roughly in the region where final bag side seals will later be formed. The heat and pressure cause meltdown and flattening of the means for tearing and zipper elements in two areas, typically substantially 0.25 inches to 1.0 inches wide, forming second side seals. Following the pre-flattening station, a web assembly of the form web with membrane web and top web sealed thereto, advances into the final seal station in a vacuum chamber. The web assembly of form web, membrane web and top web are positioned therein under a sealing die assembly. The web movement is again stopped while a vacuum is pulled or gas is purged into the chamber, and the seal die assembly, preferably simultaneously, lowered to form bag side seals and a fourth seal, a bottom edge seal between the top web and form web. The seal die assembly further forms a third seal, a weld seal bond, between the top web and the membrane web along its second surface generally opposite the first seal, preferably between the means for tearing and the second zipper element. By virtue of the preferred multi-layer membrane material, wherein the first surface is comprised of heat resistant material, the third seal may be formed without mechanically separating opposing first surfaces of the membrane web to prevent their sealing together. Thus, in the final seal station, the top web is sealed to the form web with the membrane web sealed therebetween, forming a container wherein the product is hermetically sealed in an evacuated or gas flushed volume. The sealed webs are then advanced to a severing station where the web is severed into individual sealed, evacuated or gas-flushed containers, loaded with product. The four-sided containers which result are easily opened by means for tearing, and are reclosable with interlocking first and second zipper elements.

In a further aspect of the present invention, a separate membrane is provided which may be used for sealing the opening of a bag-like structure. The membrane has first and second surfaces, and is comprised of two or more layers as described above. The membrane includes first and second interlocking zipper elements and means for tearing, preferably an oval-shaped bead of thermoplastic material, on its first surface. In addition, means for gripping may be added to the first surface. The means for tearing may, alternately, be disposed on the second surface.

A method for making a membrane is further provided. A thermoplastic membrane web having two or more layers is provided or extruded, having a first heat resistant surface, a second sealing surface and a barrier layer capable of hermetically sealing a bag therebetween. Next is a step of extruding, on the first surface, a means for tearing generally centrally down the length of the membrane web; and preferably simultaneously extruding base layers with first and second zipper elements along opposite sides of the membrane web.

BRIEF DESCRIPTION OF THE DRAWINGS

FIG. 1 is a front elevational view of the easy-open container of the present invention.

FIG. 2 is a cross-sectional view of the container of FIG. 1 along line 2—2.

FIG. 3 is an expanded cross-sectional view of the container of FIG. 1 along line 2—2.

FIG. 4 is an exploded perspective view of the container of the present invention.

FIG. 5 is an exploded cross-sectional view of the top edge of the container of FIG. 4 along line 4—4.

FIG. 6 is a perspective view of the membrane of the present invention partially folded.

DETAILED DESCRIPTION OF THE PREFERRED EMBODIMENT

Figure 7:
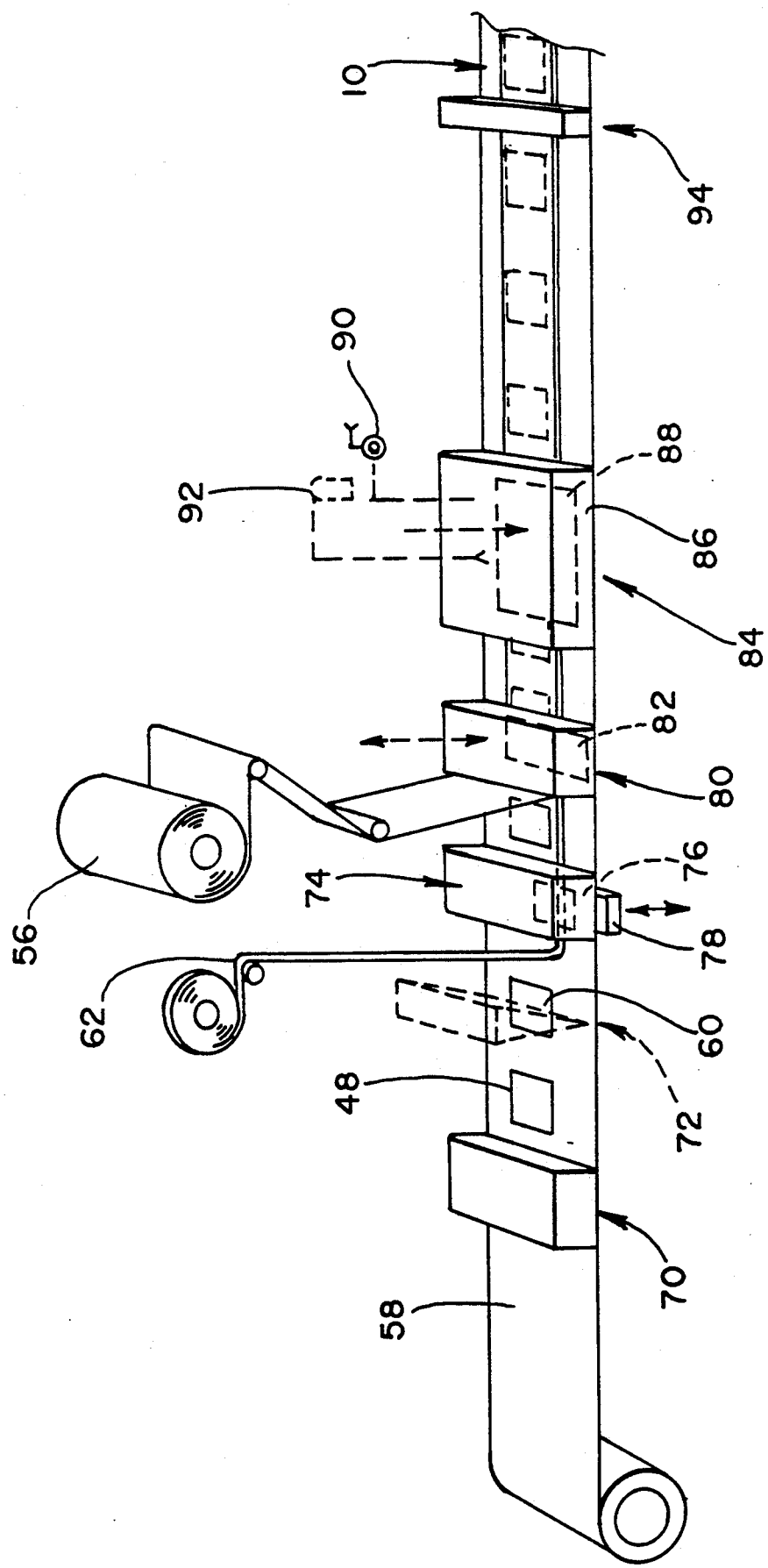
FIG. 7 is a schematic representation of the method for making a container of the present invention.

Referring to FIGS. 1 and 2, in accordance with the present invention, a reclosable flexible container 10 is shown having a membrane 12 sealing the opening of bag 14. As seen more clearly in FIG. 3, membrane 12 is sealed to the inside of bag walls 16 and 18 inward from the bag opening 20 along seals 22, 24. Portions of bag walls 16, 18 thereby extend above seals 22, 24 to form guide rails 26, 28.

Membrane 12 includes on its first surface interlocking first and second zipper elements 32, 34 and a means for tearing 30 shown also in FIGS. 4 and 5. Preferably, means for tearing 30 is an oval-shaped first bead of thermoplastic material 30', such as LDPE, which is disposed generally centrally between zipper elements 32, 34. The oval-shaped first bead of thermoplastic material 30' is preferably attached slightly off-center along a wide face of the oval between zipper elements 32, 34 to facilitate folding membrane 12. As a result, a narrow face of the first bead 30' is oriented to serve as the leading edge for tearing membrane 12 when membrane 12 is folded. Guide rails 26, 28 urge and promote upward tearing of membrane 12 by means for tearing 30, and serve as reinforcement against downward deviation of a tear line on membrane 12.

An illustrative example of membrane 12 of the present example is set forth with reference to FIG. 5. In a typical application involving a 22 cm × 30 cm container, dimension B of guide rails 26, 28 may be 2 mm, while dimension C extends downward from the top edge 7 mm. The overall dimension A from the top edge to the bottom of zipper elements 32, 34 may be 21 mm, with the bottom flap dimension F extending as desired, say 1.5 mm. The area in which seals 22 and 24 are preferably formed (shown in FIG. 3) is dimension D, which in this example is 11 mm, centered in dimension A. Dimension E, the width of zipper elements 32, 34, is given as 3.2 mm in this example.

Referring again to FIG. 1, bag walls 16, 18 are sealed together along bag side seals 36, 38 and bottom edge seal 40. As is preferred, slits 42 are provided in bag side seals 36, 38 to assist the consumer to initiate tearing of membrane 12. By virtue of guide rails 26, 28, the length or bag walls 16, 18 will remain unchanged whether container 10 is sealed or open. Bag walls 16, 18 may be of different lengths so that one guide rail may extend upward further than the other to facilitate their separation. Once container 10 is torn open, guide rails 26, 28 assist the consumer in gripping bag walls 16, 18 to obtain access to the contents of the bag. Further shown in FIG. 3 are additional means for gripping 44. Preferably second beads of thermoplastic material 44' such as LDPE, means for gripping 44 may be placed in various locations on membrane 12 as shown typically in FIG. 3. While FIGS. 1-5 and 7 show an embodiment of container 10 having a cavity 48, bag walls 16, 18 of container 10 could, as well, both be flat or have other forms impressed therein.

Referring to FIG. 6, the preferred embodiment of the membrane used in the present invention is shown. Membrane 12 is comprised of two or more layers of thermoplastic material, chosen for their advantageous sealing and manufacturing properties. In the embodiment shown, three layers are provided, inner layer 54, middle layer 52 and outer layer 50. Inner layer 54 is a heat resistant layer, preferably of HDPE, which prevents the opposing surfaces of membrane 12 and bag walls 16 and 18 from sealing together when membrane 12 is sealed to bag walls 16 and 18 to form container 10. Middle layer 52 is a barrier layer, preferably of saran, polyamide or EVOH, to provide the desired hermetic seal across bag opening 20. Outer layer 50 is a sealing layer, preferably of a carboxyl acid ethylene copolymer such as EVA or EAA, having a low heat melt temperature, which facilitates sealing membrane 12 to the inside of bag walls 16, 18. Bag walls 16, 18 are preferably made of polyethylene.

Alternatively, middle layer 52 and inner layer 54 may be combined in one material as inner layer 54' as shown in FIG. 6. In this alternative, inner layer 54' has properties which provide both heat resistant and hermetic sealing properties desired in membrane 12. One such material would be surlyn (a carboxylic acid-ethylene copolymer).

The present invention further provides a method for producing an easy-open container 10. Shown schematically in FIG. 7, a form web 58 of thermoplastic material having a top edge and a bottom edge advances to horizontal forming station 70. Preferably, cavities 48 are formed therein at spaced intervals. Form web 58 then proceeds to filling station 72 where product 60 is loaded into cavities 48. As form web 58 next proceeds to preseal station 74, folded membrane web 62, having interlocking first and second zipper elements 32, 34 and means for tearing 30 is positioned above form web 58, inward from the top edge thereof, for sealing thereto. Membrane web 62 further preferably includes perforations 35 located between zipper elements 32, 34 and means for tearing 30, preferably midway therebetween. Membrane web 62 is first fed into the tracking shoe of a back-up plate 76 and then, during a pause in web movement, sealed along its second surface to form web 58 by raising pre-seal assembly 78 to compress form web 58 and membrane web 62 together against back-up plate 76. First seal 24 (see FIG. 3), a weld seal bond, preferably extends along the second surface of membrane web 62 in an area inward from means for tearing 30 and upward from first zipper element 32. Form web 58 with membrane web 62 sealed thereto advances to pre-flattening station 80, wherein top web 56 is drawn over and positioned above form web 56 and membrane web 62. Top web 56 having top and bottom edges, is positioned so that membrane web 62 is inward from the top edge of top web 56. As the web movement again pauses, sealing assembly 82 lowers to compress top web 56 against membrane web 62 and form web 58. Heat and pressure are applied to two areas of the assembled webs by sealing assembly 82. These areas lie roughly in the regions where bag side seals 36, 38 will finally be formed. The heat and pressure cause meltdown and flattening of means for tearing 30, and zipper elements 32, 34, and sealing of top web 56 to both form web 58 and membrane web 62 to form second seals in the two areas, each substantially 0.25 to 1.0 inches wide. Following pre-flattening station 80, a web assembly of form web 58 with membrane web 62 and top web 56 sealed thereto, advances into final seal station 84 in vacuum chamber 86. The web assembly of form web 56, membrane web 62 and top web 56 are positioned therein under sealing die assembly 88. Web movement is again paused while chamber 86 is evacuated by vacuum pumping means for pumping 90. Perforations 35 in membrane 12 also permit evacuation of air trapped in membrane 12 between zipper elements 32, 34 and means for tearing 30. Gas may also be purged into chamber 86 at this time by means for injecting gas 92 to package or preserve product 60. Preferably simultaneously, seal die assembly 88 is lowered to finally form bag side seals 36, 38 and a fourth seal, bottom edge seal 40. Seal die assembly 88 also forms third seal 24 (see FIG. 3) at this time, a weld seal bond, between top web 56 and membrane web 62, extending along the second surface of membrane web 62 generally opposite first seal 22, between means for tearing 30 and second zipper element 34. In addition, third seal 22 also covers the area of membrane web 62 having perforations 35, to seal perforations 35, first seal 24 having performed the same additional function, as well.

Alternatively, where membrane 12 does not include perforations 35, membrane web 62 and contiguous portions of top web 56 and form web 58 are disposed outside chamber 86, while cavity 48 in form web 58 and contiguous portions of top web 56 are inside chamber 86 for evacuation or gas-flushing. In this alternative, a peel seal 37 may preferably be formed in the area generally below zipper elements 32, 34 to seal product 60 in vacuum or in gas. (See FIG. 5). Finally, the method of the present invention may equally be practiced to produce unevacuated or non-gas flushed containers.

Regardless of the precise manner of sealing, the sealed web assembly including webs 56, 58 and 62 is then advanced to severing station 94 where the sealed web assembly is severed into individual sealed, evacuated or gas-flushed containers 10, loaded with product. While the method of the present invention is representatively shown producing a series of single containers 10, the method may be practiced to produce multiple containers 10 side by side or in groups. As well, the position of first and second zipper elements 32, 34 on membrane web 62 may be reversed.

In a further aspect of the present invention, a separate membrane 12 is provided. Membrane 12 is shown in FIG. 6, partially folded. Membrane 12 may be used for sealing the opening of a bag-like structure such as opening 20 of bag 14 shown in FIG. 3. Best shown in FIGS. 3-5, membrane 12 includes first and second interlocking zipper elements 32, 34 and means for tearing 30, preferably an oval-shaped first bead of thermoplastic material 30'. Preferably, membrane 12 also includes perforations 35 to aid in evacuating an assembly including membrane 12.

Means for tearing 30 is shown, as is preferable, disposed on the first, inner surface of membrane 12, but could also be disposed on the second, outer surface of membrane 12 or integral in the material itself. Preferably, first bead 30' is attached slightly off-center between zipper elements 32, 34, to enhance folding of membrane 12. By attaching a wide face of first bead 30' to membrane 12, a narrow face of first bead 30' may be oriented upward when membrane 12 is folded to serve as the leading edge for tearing.

As further shown in FIG. 6, membrane 12 is comprised of two or more layers of thermoplastic material having qualities, characteristics and material composition as previously described above. In addition, means for gripping 44, preferably second beads of thermoplastic material 44' such as LDPE, may be added to membrane 10 on the first, inner surface thereof as shown FIG. 3.

Finally, a method for making a membrane for use in sealing the opening of an easy-open container 10 is provided. The first step is to provide or extrude a thermoplastic membrane web 62 having two or more layers including a first heat-resistant surface and a second sealing surface. The next step is extruding a means for tearing 30, preferably an oval-shaped first bead of thermoplastic material 30' onto the first surface of membrane web 62. This step further includes simultaneously extruding base layers known in the art with interlocking first and second zipper elements 32, 34 onto the first surface of membrane web 12. Interlocking zipper elements 32, 34 are disposed generally along opposite edges of membrane web 62, while first bead 30' is generally centrally disposed therebetween, preferably slightly off-center. The method may further comprise folding membrane web 12 to bring interlocking first and second zipper elements 32, 34 into opposing relationship. The method may preferably further include perforating opposing portions of membrane 12, along its length between zipper elements 32, 34 and means for tearing 30, preferably midway therebetween. Further, the step of extruding first bead 30', base layers and zipper elements 32, 34 may include also extruding means for gripping 44, comprising one or more second beads of thermoplastic material 44', onto the first surface of membrane web 62.

While certain representative embodiments and details have been shown for purposes of illustrating the invention, it will be apparent to those skilled in the art that various changes in the articles and methods disclosed herein may be made without departing from the scope of the invention, which is defined in the appended claims.

What is claimed is:

1. An easy-open flexible container comprising:
   a bag structure of thermoplastic material having an opening defined by two generally opposing bag walls; and
   a membrane having a first surface and a second surface, and said membrane further including:
   interlocking first and second zipper elements disposed on said first surface of said membrane; and
   means comprising a bead of thermoplastic material for tearing said membrane disposed generally centrally between said first and second zipper elements;
   said membrane folded to form a container edge and seal said opening, said membrane attached along said second surface thereof to the inside of said bag walls, portions of said bag walls extending upward beyond said container edge to form guide rails.

2. An easy-open container as recited in claim 1 wherein said means for tearing is disposed between said zipper elements, positioned generally centrally therebetween but slightly off-center.

3. An easy-open container as recited in claim 1 wherein said film is attached to said bag walls along portions of said second surface upward from said zipper elements, and portions of said membrane bearing said zipper elements extend downward unattached to said bag walls.

4. An easy-open container as recited in claim 1 wherein said membrane is of a different thickness than said web.

5. An easy-open container as recited in claim 4 wherein said membrane thickness is less than that of said web.

6. An easy-open container as recited in claim 1 wherein said membrane is comprised of two or more layers.

7. An easy-open container as recited in claim 1 wherein said bead of thermoplastic material has two wide and two narrow faces, generally oriented so that one of said narrow faces comprises the leading edge of said tear strip.

8. An easy-open container as recited in claim 1 wherein said bead of thermoplastic material is disposed on said second surface generally along said container edge formed by said membrane.

9. An easy-open container as recited in claim 1 wherein one or more of said portions of said bag walls extending beyond said container edge further comprise means for gripping said bag walls.

10. An easy-open container as recited in claim 9 wherein said means for gripping comprises one or more beads of thermoplastic material.

11. An easy-open container as recited in claim 10 wherein said membrane further comprises means for gripping disposed on said first surface between at least one of said one or more beads of thermoplastic material and at least one of said first and second zipper elements.

12. An easy-open flexible container comprising:
    a bag structure of thermoplastic material having an opening defined by two generally opposing bag walls; and
    a membrane having a first surface and a second surface, and said membrane further including:
    interlocking first and second zipper elements disposed on said first surface of said membrane; and
    means for tearing said membrane disposed generally centrally between said first and second zipper elements;
    said membrane folded to form a container edge and seal said opening, said membrane attached along said second surface thereof to the inside of said bag walls, portions of said bag walls extending upward beyond said container edge to form guide rails;
    wherein said membrane is comprised of two or more layers and comprises:
    an inner layer both for hermetically sealing the contents of said bag structure and for preventing the fusing together of said bag walls when sealing said membrane thereto; and
    an outer layer for sealing said membrane to said bag walls.

13. An easy-open container as recited in claim 12 wherein said inner layer is comprised of a high density polyethylene.

14. An easy-open container as recited in claim 12 wherein said outer layer is comprised of carboxylic acid ethylene copolymer.

15. An easy-open flexible container comprising:
    a bag structure of thermoplastic material having an opening defined by two generally opposing bag walls; and
    a membrane having a first surface and a second surface, and said membrane further including:
    interlocking first and second zipper elements disposed on said first surface of said membrane; and
    means for tearing said membrane disposed generally centrally between said first and second zipper elements;
    said membrane folded to form a container edge and seal said opening, said membrane attached along said second surface thereof to the inside of said bag walls, portions of said bag walls extending upward beyond said container edge to form guide rails;
    wherein said membrane is comprised of two or more layers and comprises:
    an inner heat resistant layer to prevent fusing together said opposing bag walls when attaching said folded membrane thereto;
    a middle barrier layer for hermetically sealing said bag; and
    an outer sealing layer for sealing said membrane to said bag walls.

16. An easy-open container as recited in claim 15 wherein said heat resistant layer is comprised of high density polyethylene.

17. An easy-open container as recited in claim 15 wherein said barrier layer is comprised of polyvinylidene chloride, ethylene vinyl alcohol or polyamide.

18. An easy-open container as recited in claim 15 wherein said sealing layer is comprised of low density polyethylene.

19. A membrane for sealing on opening of a bag structure to form an edge of an easy-open container, wherein said membrane has a first surface and a second surface, and further comprises:

interlocking zipper elements disposed on said first surface of said membrane; and means comprising a bead of thermoplastic material disposed generally between said first and second zipper elements for tearing said membrane; and wherein said membrane is comprised of two or more layers.

20. A membrane as recited in claim 19 wherein said membrane comprises:

an inner heat resistant layer to prevent fusing together said first surfaces when folding and sealing said second surfaces to seal the opening of the bag structure;

a middle barrier layer for hermetically sealing the opening of the bag structure; and an outer sealing layer for sealing said membrane to the walls of the bag structure.

21. A membrane as recited in claim 20 wherein said inner heat resistant layer is comprised of high density polyethylene.

22. A membrane as recited in claim 20 wherein said barrier layer is comprised of polyvinylidene chloride or ethylene vinyl alcohol, or polyamide.

23. A membrane as recited in claim 20 wherein said outer sealing layer is comprised of carboxylic acid ethylene copolymer.

24. A membrane as recited in claim 19 wherein said membrane comprises:

an inner layer both for hermetically sealing the bag structure and for preventing the fusing together of said first surfaces when folding and sealing said second surfaces to seal the opening of the bag structure; and an outer layer for sealing said membrane to the walls of the bag structure.

25. A membrane as recited in claim 24 wherein said inner layer is comprised of a high density polyethylene.

26. A membrane as recited in claim 24 wherein said outer layer is comprised of carboxylic acid ethylene copolymer.

27. A membrane as recited in claim 19 wherein said means for tearing comprises a bead of thermoplastic material.

28. A membrane as recited in claim 27 wherein said bead of thermoplastic material comprises an oval-shaped bead having two wide and two narrow faces, generally oriented so that one of said narrow edges comprises the leading edge thereof for tearing.

29. A membrane as recited in claim 19 further comprising means for gripping.

30. A membrane as recited in claim 19 wherein said means for gripping comprises one or more beads of thermoplastic material.

31. A membrane as recited in claim 30 further comprising means for gripping disposed on said first surface between at least one of said one or more beads of thermoplastic material and at least one of said first and second zipper elements.

32. A membrane for sealing on opening of a bag structure to form an edge of an easy-open container, wherein said membrane has a first surface and a second surface, and further comprises:

interlocking zipper elements disposed on said first surface of said membrane; and means for tearing said membrane disposed generally between said first and second zipper elements; and wherein said membrane is comprised of two or more layers and comprises a plurality of perforations disposed between one or more of said interlocking zipper elements and said means for tearing.

33. A membrane as recited in claim 32 wherein said perforations are generally disposed midway between said means for tearing and at least one of said interlocking zipper elements.

* * * * *